United States Patent [19]

Guryel

[11] Patent Number: 5,956,696
[45] Date of Patent: *Sep. 21, 1999

[54] ATTENDANCE REGISTRATION SYSTEM BY RADIO LINK

[76] Inventor: Ali Guryel, 417-421 Bromley Road, Downham, Bromley, Kent BR1 4PJ, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/411,776

[22] PCT Filed: Oct. 7, 1993

[86] PCT No.: PCT/GB93/02079

§ 371 Date: Mar. 31, 1995

§ 102(e) Date: Mar. 31, 1995

[87] PCT Pub. No.: WO94/08410

PCT Pub. Date: Apr. 14, 1994

[30] Foreign Application Priority Data

Oct. 7, 1992 [GB] United Kingdom .................... 9221074

[51] Int. Cl.[6] .................................................. G06F 17/00
[52] U.S. Cl. ................................................. 705/32; 705/28
[58] Field of Search ................................. 395/800, 200.1, 395/200.09; 340/600; 370/340; 705/28, 30, 32

[56] References Cited

U.S. PATENT DOCUMENTS

| | | | |
|---|---|---|---|
| 5,179,569 | 1/1993 | Sawyer | 340/600 X |
| 5,195,183 | 3/1993 | Miller et al. | 340/825.07 X |
| 5,309,351 | 5/1994 | McCain et al. | 340/825.06 X |
| 5,319,877 | 6/1994 | Schmerer et al. | 705/28 |
| 5,434,775 | 7/1995 | Sims et al. | 705/8 |

(List continued on next page.)

FOREIGN PATENT DOCUMENTS

| | | |
|---|---|---|
| 215646 | 3/1987 | European Pat. Off. . |
| 314217 | 5/1989 | European Pat. Off. . |
| 475681 | 3/1992 | European Pat. Off. . |
| 2190525 | 11/1987 | United Kingdom . |
| WO 85/01582 | 4/1985 | WIPO . |
| WO 87/00659 | 1/1987 | WIPO . |

OTHER PUBLICATIONS

WPI/DERWENT; SU468278; "Lesson attenance remote registration circuit —is simplified using additional circuitry increasing operational reliability", abstract only, May 1975.

Wittie: "Communications Structures for Large Networks of Microcomputers", IEEE Transactions on Computers, vol. C–30, No. 4; pp. 264–273, Apr. 1981.

(List continued on next page.)

*Primary Examiner*—Edward R. Cosimano
*Attorney, Agent, or Firm*—Fay, Sharpe, Beall, Fagan, Minnich & McKee

[57] ABSTRACT

A method of electronically registering student attendance data includes storing a plurality of student names in a central collection station. The stored student names are downloaded and stored to at least one portable data collection device. The portable data collection device is used to access the set of student names stored therein and one select student name from the set of student names is displayed on a visual display of the portable data collection device. The portable collection device prompts an operator thereof to input attendance data for the select displayed student name into the portable data collection device. The operator input attendance data includes one of a first input indicating that the student having the select displayed name is present, a second input indicating that the student having the select displayed name is absent, and a third input indicating that the student having the select displayed name is tardy. The input attendance data for each select student name is stored in the portable collection device and the foregoing is repeated for each student name in the downloaded set of student names. The input student attendance data is then uploaded from the portable data collection device to the central data collection station and stored in said central data collection station. A student attendance report is generated using the attendance data stored in the central data collection station.

9 Claims, 2 Drawing Sheets

U.S. PATENT DOCUMENTS

| | | | |
|---|---|---|---|
| 5,436,960 | 7/1995 | Campana, Jr. et al. | 379/58 |
| 5,515,303 | 5/1996 | Cargin, Jr. et al. | 364/708.1 |
| 5,594,786 | 1/1997 | Chaco et al. | 379/38 X |
| 5,644,725 | 7/1997 | Schmerer | 705/28 |
| 5,717,737 | 2/1998 | Doviak et al. | 455/403 |
| 5,726,984 | 3/1998 | Kubler et al. | 370/349 |

OTHER PUBLICATIONS

Lo et al: "Indoor Wireless Lan Access Methods for Factories", 40th IEEE Vehiclar Technology Conference, Orlando, Florida; pp. 113–118, May 1990.

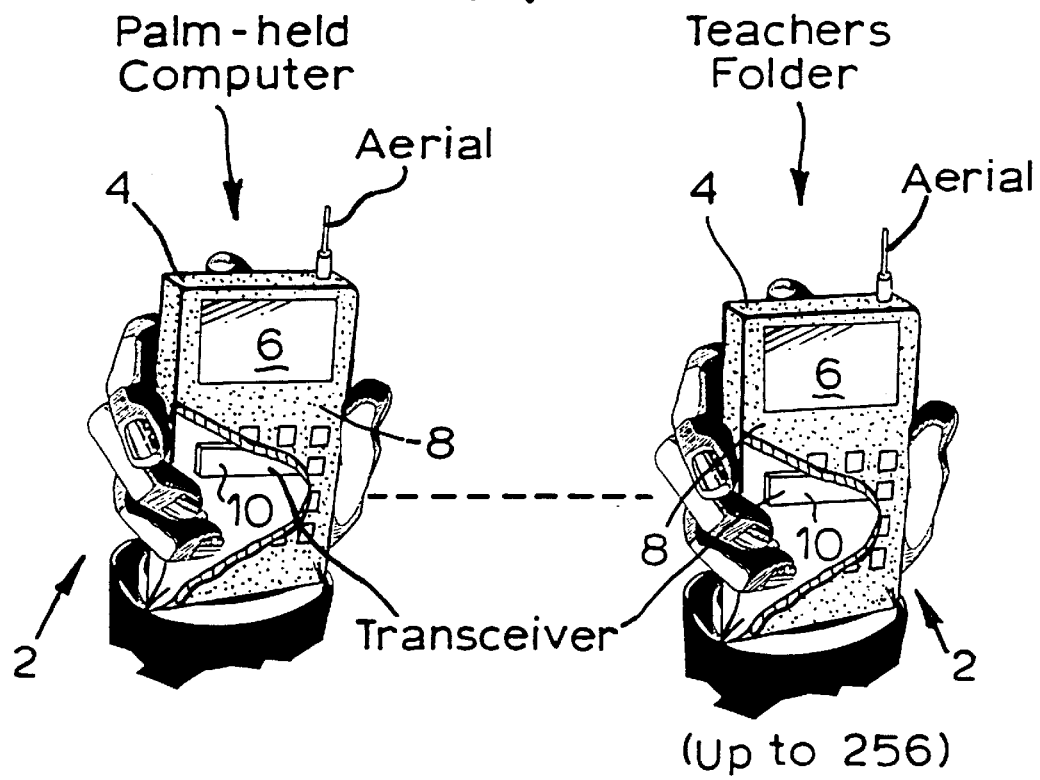
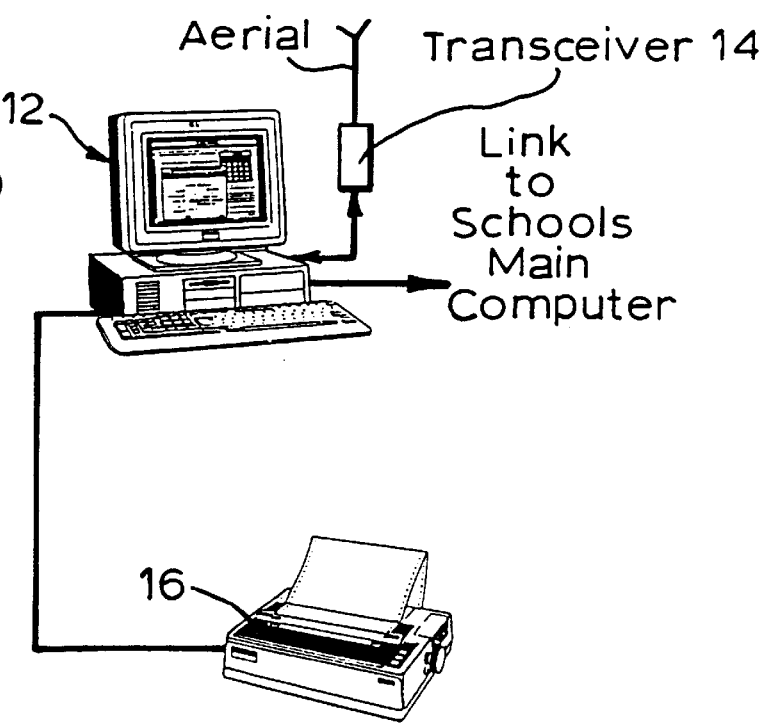

ATTENDANCE REGISTRATION SYSTEM BY RADIO LINK

BACKGROUND OF THE INVENTION

This invention relates to data logging systems, and in particular, to systems for logging or registering items of data related to persons or articles. It is particularly, although not exclusively, adapted for use as a classroom roll-taking system, for recording the presence or absence of pupils or students, their test results and other such data.

Various alternative methods of automating the collection of attendance data in schools have previously been proposed, including systems in which pupils are issued with cards which must be inserted in card readers to record attendance, and systems in which specially prepared forms are completed in the classroom, and subsequently inserted into a "optical mark reader" at a central point, to transfer the information into the schools information system.

Both of these systems have specific weaknesses, and in particular, the card reader system is open to abuse by pupils who give their cards to others to make registrations for them, while the "optical mark reader" system suffers from the inherent deficiency of "paper bound" systems, since it requires the completed forms to be physically transferred from the classroom to the school office, wasting staff time and also, of course, giving rise to pupil supervision problems if the teachers themselves are required to deliver the collected data.

SUMMARY OF THE INVENTION

Accordingly, the present invention provides a data collection system particularly suitable for use as an "electronic attendance register" system, comprising one or more portable computer devices, forming a mobile data collection means, each including data transceiving means and an attendance data collection program, and a central data collecting station comprising a further computer including at least one data transceiving means and a data collation programmed for assembling data transmitted from the individual portable computer device.

Preferably, the central data collection station comprises a network of wireless transceivers distributed over the area of the premises which are connected to a central computer.

Preferably, the transceivers of the central data collection station are radio devices, but alternatively, other methods of data communication, such as modem links or broad band networks may be utilized. For example, data could be transmitted via the schools internal telephone network, but it will be appreciated that radio links have the advantage that the apparatus can be made completely portable, without any temporary or permanent connections being required, to fixed apparatus installed in the premises.

Preferably, the program of the portable computer is adapted to present the name of each pupil in turn, so as to prompt the teacher to respond appropriately, in accordance with a predetermined number of options, to enable an appropriate record to be made for that pupil. For example, a single key stroke such as "\", "φ", "L" may be used to indicate that the pupil is present, absent or late respectively and two key strokes, such as a letter code plus "enter", may be used to indicate other circumstances, so as to minimise the time and number of key strokes required for each roll call.

In use, when all the attendance data has been collected, the portable computer device is arranged to transmit it to the central computer collection station, and preferably, a known communication protocol will be used to establish that the data has been properly received in uncorrupted form.

In addition, the individual portable computers may also be provided with further software for storing pupils performance records, and other general purpose "personal computer" type software such as spread sheets, calculator, or memo writing.

BRIEF DESCRIPTION OF THE DRAWINGS

One embodiment of the invention will now be described by way of example, with reference to the accompanying drawings, in which:

FIG. 1 is a diagrammatic illustration of a number of portable computer devices in accordance with the invention;

FIG. 2 is a schematic illustration data of a central collection station for receiving data transmitted from the individual portable computer devices; and, FIG. 3 is a flow chart depicting a method of electronically registering student attendance data in accordance with the present invention.

DETAILED DESCRIPTION OF THE INVENTION

Figure 3:
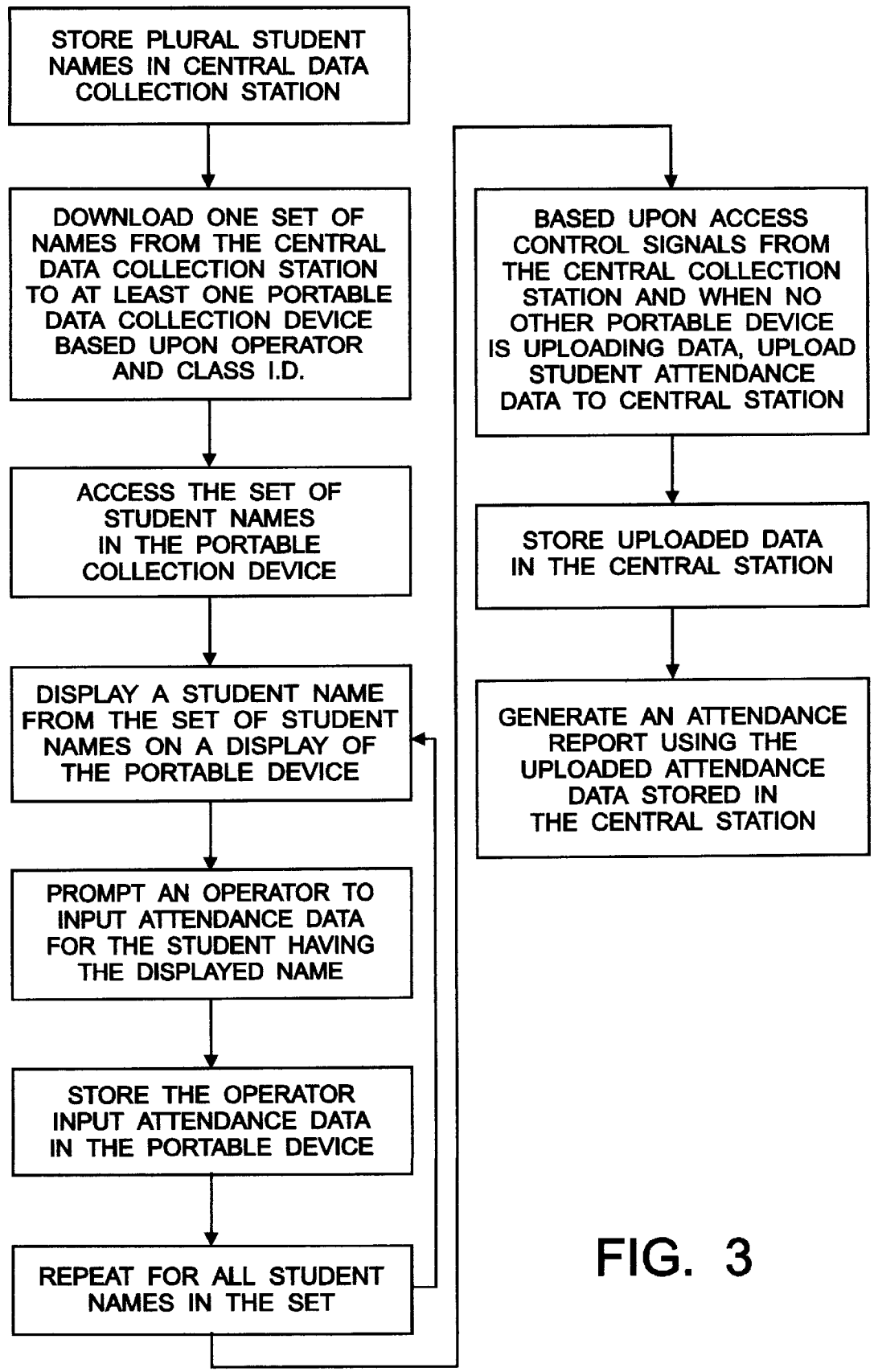

Referring to FIG. 1 through 3, each of the portable computer devices 2 comprises a "palm top" or "lap top" computer 4 which is preferably incorporated in a robust A4 size computer folder. Each portable computer device 2 preferably includes a small display screen 6, such as a multi-line LCD display, a keyboard 8, and a transceiver unit 10 which may, for example, operate on a suitable UHF/VHF band. In the preferred embodiment the transceiver is a license exempt compliant RF transmitter/receiver module.

A suitable number of these portable computer devices will be provided, so that each teacher can carry one, and in use, the teacher starts the operator by entering security code (PIN-Personal Identity Number) and class designation. The portable computer device 2 communicates with a central data collection station system and down loads the list from the central system. In order to complete the register, the name of each pupil in the class is presented in turn on the display 6, and the teacher will indicate, in response to the name, whether that pupil is present. When the operation has been completed in respect of all pupils on the list held in the device, a signal including all the assembled attendance information, preferably with an identifier characteristic of that particular portable device 2, will be transmitted to the central data collection station at the school office.

As illustrated diagrammatically in FIG. 2, the central data collection station will typically comprise a standard "desk top" personal computer (PC) 12, arranged as a multi-tasking server, which is connected to a radio transceiver unit, or "RTU", 14, and also having a printer 16 for producing "hard copies" of attendance reports.

Accordingly, the central PC 12 will be able to automatically record the attendance of all pupils, once the input from each class has been received, and suitable reports, in accordance with class or other desired parameters, can then be generated in conventional fashion.

It will also be appreciated that the system as illustrated provides the basis of a "network" by means of which information can be exchanged, as "electronic mail", and the portable computer devices 2 can also be enhanced by the addition of further software for keeping pupil performance records, for spread sheet manipulation, calculator operations, memo writing or word processing. Because the individual portable computer carried by the teachers are completely portable, and require no external connections, a considerable saving may be made in terms of staff time in particular, since the necessity for teachers to make frequent trips to the school office to deliver or collect information, can be avoided.

The operation of the system will now be described in more detail. In practice the central data collection station includes a plurality of transceivers ("RTUs") 14, and these are connected to the central PC 12 by RS-485 serial links. Each RTU 14 comprises a license exempt RF transmitter/receiver module, microprocessor based control circuitry, and an RS-485 interface for communication with the central PC 12, as explained below.

Folder to RTU Transmission

Each RTU 14 generates periodic FREE slots which can be used by a portable computer device to initiate a transmission. The RTU 14 checks for "Data Carrier" before the FREE signal is transmitted in order to avoid collision with another ongoing transmission. When the portable device 2 detects a FREE signal it waits for a short period of random length and checks for a "Data Carrier" signal, in order to determine whether another portable device 2 or RTU 14 is already transmitting, and if not, it transmits a "Request to Send" command.

A CLEAR to SEND command transmitted from the RTU 14 to the portable device 2 indicates that the arbitration has been won, otherwise the portable device 2 waits for the next FREE signal to retry (see below). When the portable device 2 receives CLEAR to SEND command, it then transmits its actual command/data request and waits for an ACKNOWLEDGE. If the ACKNOWLEDGE comes within 5 seconds the cycle is completed, otherwise the transmission is considered to have failed and the arbitration cycle is repeated.

If the portable device 2 expects a reply and/or data block from the central PC 12 in response to its request, it will wait for a maximum of 20 seconds. If nothing is received from the RTU 14 which received and acknowledged the request after 20 seconds, the portable device 2 considers the transmission as failed and it repeats the arbitration cycle. If the portable device 2 requests a lengthy transfer from the central PC 12, such as form/class list transmission, and a transmission error is detected, the portable device 2 requests the retransmission of only the failed blocks.

If the portable device 2 transmits additional data and it fails to get the ACKNOWLEDGE within 5 seconds, it transmits a FAILED to GET LAST ACK message to the RTU 14 and waits for a further 5 seconds. If the ACKNOWLEDGE is still not received at the end of the second wait, the transmission is considered failed and the portable device 2 repeats the arbitration cycle. The purpose of this second wait is to minimise the repeat of lengthy transmissions like form/class list and attendance list transfers. It is possible that the acknowledge from the RTU 14 may get corrupted even if the data transmission from the portable device 2 goes through correctly. In this case, the retransmission of the ACKNOWLEDGE will be much quicker than repeating the whole cycle.

If an existing "Data Carrier" signal is detected the portable device 2 will wait for a further, shorter random length period before retrying, and the process will be repeated until the wait period is reduced to zero length so as to give priority to the longest waiting C-Folders.

The frequency of the FREE signals is configurable for each site, and is determined by the duration of the longest possible RTU 14 C-Folder transmission and maximum number of RANDOM slots. These two factors are also configurable with the first being dependent on the Registration Group sizes for the site, and the latter being determined by the concentration of portable devices 2 in the zone of each RTU 14.

The RF communication between the portable devices 2 and RTUs 14 follows a special protocol referred to hereinafter as "EARS" and utilizes an EARS command block ("ECB") structure described below which, amongst other information includes the origin of the transaction. Whenever appropriate, this information is used by the central PC 12 to decide which zone the reply is sent to when transmitting data to a C-Folder. only one active C-Folder transmission per RTU is allowed at one time. However it is possible for portable devices 2 in different zones to initiate RF transmission simultaneously, provided that there is an adequate distance between them so that they do not detect each others Data Carrier. Furthermore, the frequency of the FREE signals is adjusted in such a way that if the first portable device 2 which got through in the beginning of the FREE slot only does a short transmission, there is a sufficient time left for a second short transmission by a re-trying portable device 2.

RTU to Folder Transmission

RTUs 14 play the role of network access controller in the EARS RF Protocol. The periodically generated FREE Signals form the bases of access control for all portable devices 2 waiting to start RF transmission.

As the FREE Signal follows the ECB structure, it is possible to transmit embedded information to other EARS devices. This includes transmission of a list of "banned" portable device ids, indication of the presence of electronic mail/pager message, list of activities prohibited during peak loadings of the EARS network etc.

RTU to portable devices 2 transmission takes place by replacing the FREE signal with other commands, usually in response to the requests/commands received from portable devices 2.

After transmitting the FREE signal, the RTU will wait for a pre-specified time for replies from portable devices 2. To start the arbitration cycle, the first command from a portable device 2 will be REQUEST to TRANSMIT. If more than one portable device 2 request is received, the RTU 14 acknowledges the first one by transmitting a CLEAR to SEND command, specifically addressed to the relevant device 2 portable device 2. The RTU then allows only 1 second for the command/request to be transmitted from the portable device 2. The assumption is that the portable device 2 will have finished all the necessary preparations before queuing up for transmission, therefore having been given the "go-ahead" it will be able to transmit its request immediately. This approach helps to minimise unnecessary delays on the EARS RF protocol. One the RTU 14 receives a request from a portable device 2, all following transmissions will be addressed to the specific portable device 2 until the cycle is completed.

Having transmitted the CLEAR to SEND and receiving the command/request, the RTU 14 then ACKNOWLEDGES the reception, which serves to put the requester on a wait while the request is being dealt with. The RTU 14 then transmits the request to the central PC 12 via the RS-485 link and resumes the transmission or the FREE signals. It is possible for the RTU 14 to buffer as much as 5 portable device requests while the central PC 12 is still acting on the first one. Once the central PC 12 finishes processing the request, the reply is transmitted back to the RTU 14 on the RS-485, with all the original address information still intact.

The RTU 14 the uses this information to transmit the reply/back to the relevant portable device 2 in the next FREE signal slot. If the reply is a short one, i.e. it does not contain additional data, the RTU 14 only waits 2 seconds for an ACKNOWLEDGE, and does not insist on having one. However, if the response has additional data attached, the RTU 14 will wait for the ACKNOWLEDGE for up to 5 seconds, and if not received will transmit a FAILED TO GET LAST ACK message to the requesting device 2. If the ACKNOWLEDGE is not received after a further wait of 5 seconds, the RTU 14 gives up and starts the transmission of the FREE signals. In that case the portable folder has to go through the arbitration cycle if it wants to request the data block again. When a reply is being transmitted back to a portable device 2 the RTU 14 does not carry out any initiating activities, rather, it assumes that the device 2 is waiting to receive the reply for the request/command previously submitted.

When the central PC 12 replies to a request from a portable device 2, it is able to extract the Zone information from the incoming ECB and direct the reply accordingly. A dedicated ECB command issued by the central PC 12, tells all RTUs 14 to HALT the FREE signal while, at the same time, transferring the reply data to the RTU 14 serving the ZONE where the request originates from. At the next periodic occurrence of the FREE signal, this RTU 14 then transmits the appropriate ECB to transfer the data to the requesting portable device 2. The RTU 14 then immediately reports to the central PC 12 which then RELEASES the RTUs to proceed with the transmission of the FREE signal. The RELEASE command also is used as a means of synchronising the internal timer of the RTUs 14 to generate the periodic FREE signal.

Since the FREE signal conforms to the ECB structure, it is possible to transmit control commands embedded into the ECB. For example, certain portable device 2 may be prohibited from transmission, or non-urgent activities may be suspended at peak times of the network.

RTU Server Communication

By handling the RF transmission load locally, RTUs 14 enable the central PC 12 to efficiently service the requests originating from the portable device 2. ECB's coming from the Folders will be optionally time stamped when initiated so that the central PC 12 can prioritise the replies to minimise the delays. This proves useful especially for large installations.

The central PC 12 communicates with the RTUs 14 via a RS-485 link at 19.2 Kbps. This is a single-driver/multi-receiver protocol which allows commands to be sent to all RTUs 14 at the same time. However, transfer of data between RTUs and the central PC 12 is done on polling bases. When polling the RTUs 14, incoming data is transferred to the central PC 12 immediately. However, if data is requested from the central PC 12, the response may be immediate or queued depending on the type of request. portable devices 2 generate three types of requests, as listed below.

1. Request confirmation of a list
2. Requests a list/message
3. Return a marked list/message Reply to Type 1 request can be either an immediate CONFIRMation if the list has not changed or a queued UPDATE if the list has changed. Reply to Type 2 is always queued. In the case of Type 3 request, the list is immediately transferred from the RTU to the central PC 12, and the relevant RTU 14 is instructed to send an ACKnowledge back to the portable device 2 at the next FREE slot, while the other RTUs 14 are HALTed.

Radio Frequency Protocol

All communications between the portable device 2 and its closest RTU 14 are under the control of a set protocol (the "EARS" protocol). This has been designed to allow as many portable devices 2 as possible to use the RTU 14 at one time, but still allow a fast data transfer when required. The RTU 14 at all times is considered to be in control of the channel and it makes 'slots' available to the portable device 2 by transmitting a 'free-pulse' (invitation to transmit) at regular intervals to which the portable devices 2 can respond to if they wish to transmit. If the RTU 14 wishes to transmit data to a portable device 2 in its range, it does so by substituting a data packet for the free pulse.

Data is protected by two mechanisms, the first is with a simple checksum system where each block is checksummed on transmission and receipt, and if there is a difference the block is re-transmitted. Also all data blocks above 128 bytes in length are split into effective blocks, and these blocks are checksummed individually and these checksums are transmitted after the block, so that if part of the transmission is corrupted, only a small amount has to be re-transmitted.

The EARS RF Communication Protocol is based on the Slotted Aloha principle utilising a non-persistent Carrier Sense Multiple Access (CSMA) mechanism.

In the EARS adaptation of this protocol, all RF communication is controlled by the FREE signals periodically generated by the RTUs. These signals are used as an indication to portable devices 2 that the RTUs are ready to receive commands or data requests.

EARS Control Block (ECB)

All RF communication takes places in a structural format controlled with EARS Command Blocks—ECBs, which have the following structure:

| Bytes | Contents |
|---|---|
| 0–1 | lead bytes |
| 2 | command byte |
| 3–5 | destination |
| 6–8 | origin |
| 9 | block number |
| 10–11 | length |
| 12 | checksum |

Lead Bytes

'>–' indicates portable device to RTU transmission

'<–' indicates RTU to portable device transmission

'>+' indicates RTU to central PC transmission

'<+' indicates central PC to RTU transmission

Command Byte

RTU to portable device commands

30h Free Signal—issued by RTU to indicate free status

31h Pupil List—RTU transmits the requested form/class list

32h Authorisation Failure—invalid or unauthorised PIN

33h Invalid Form—requested FORM does not exist

35h Clear to Transmit—RTU indicates to a specific portable device to start transmission 39h Configuration Page—School specific configuration page 3Bh Version Incompatibility—requesting portable device is running incompatible or incorrectly configured version of the EARS Software Folder to RTU Commands 21h Logon Request—portable device requests user authorisation and form/class list 22h Attendance List—portable device transmits the attendance list 23h Request to Transmit—portable device requests permission to transmit 24h Retransmit Block—portable device requests retransmission of specified block(s)

26h Request Config Page—portable device requests configuration page

Common Commands

34h Acknowledge—RTU acknowledges successful reception of last portable device transmission 36h Checksum Block—checksum table for the previous data block 37h Failed Acknowledge—RTU indicates to the portable device that last ACKNOWLEDGE was not received Designation: indicates who the command blocks is designated to.

Xnn: where x is the device designator nn: is the ASCII coded hexadecimal device number

R=RTU

F=portable device

P=Data Server

S=Repeater

Origin: Indicates the originator of the command in the same format as the Destination Block Number: Indicates Block Number in multi-block re-transmission Length: Length of the ECB+attached data block. Certain commands will carry additional data attached to the end of the ECB length of which is added to this field.

Checksum: Checksum byte for the ECB contents only. If additional data is attached, separate checksum bytes will be included within the data structure.

Carrier Sense Multiple Access Mechanism

EARS RF Communication Protocol uses a non-persistent carrier sense mechanism to allow multiple RF transmissions to take place without interfering with each other. In accordance with the protocol, an EARS device (RTU 14 or portable device 2) wishing to start RF transmission, first checks for the presence of another ongoing transmission. If none is detected the device immediately starts transmitting. If the device detects ongoing transmission, it gives up its turn and tries in the next slot, hence the non-persistency. For the RTUs 14 the next retry will happen at the periodic FREE Signal Slot. The portable device 2 will retry next time it receives a FREE Signal from an RTU. This non-persistent mechanism prevents retrying devices from causing a pile-up effect.

If an RTU 14 fails to start transmission due to ongoing transmissions; it reports RF LOCKED OUT status to the central PC 12. After the third consecutive failed transmission, the central PC 12 commands the RTU 14 to shift its FREE Signal slot by a small amount, and the process repeats until the RTU 14 finds an empty transmission slot. Following diagrams show the carrier sense and retry process.

Multi-Block Data Transmission

Data transfers on the EARS RF protocol are structured in 128 byte blocks to help with recovering from transmission errors. Each data block carries all necessary information such as length, block number and checksum to enable independent error checking during the transmission. It is also possible for the receiving end to ask for a block checksum table to be transmitted, which is used when multiple block errors are detected.

If a large data stream, which will require multiple blocks is to be transferred, the transmitting end will prepare the necessary number of 128 byte blocks. These blocks will then be concatenated and transmitted in one go. Since the blocks maintain their individual identity within the data stream, the receiving end will be able to isolate the corrupted blocks in case of a transmission failure. It is then possible to request re-transmission of only the failed blocks, which will be inserted into their correct position in the data stream. This method provides the best possible transfer rate. Since it does not include the overload of individual send/acknowledge cycles, or the need to re-transmit the whole data stream in case of a single error.

The operation of the protocol is illustrated below by means of examples:

1. A data block of under 128 bytes in length that transmits correctly.

| RTU Action | Portable Device Action |
|---|---|
| <free pulse> | |
| | <request to transmit> |
| <Ok to transmit> | |
| | <data block> |
| <acknowledge OK> | |

2. A data block that is 512 bytes in length and has one byte corrupted in the first block:

| RTU Action | Portable Device Action |
|---|---|
| <free pulse> | |
| | <request to transmit> |
| <OK to transmit> | |
| | <data block 0> |
| | <checksums block> |
| <retransmit block 0> | |
| | <data block 0> |
| | (. . . and so on) |

3. Two portable devices each trying to transmit a data block, of less than 128 bytes in length:

| RTU Action | Portable Device Action |
|---|---|
| <free pulse> | |
| | <Portable Device-1:request to transmit> |
| | <Portable Device-2:request to transmit> |
| <OK to transmit Portable Device-1> | |
| | <Portable Device-1:data block> |
| <acknowledge OK> | |
| <free pulse> | |
| | <Portable Device-2:request to transmit> |
| <OK to transmit Portable Device-2> | |
| | <Portable Device-2:data block> |
| <acknowledge OK> | |

RTU to Server Protocol

There is also a need for a protocol for all the RTU devices 14 to send all their data to the central PC 12 as they all are connected to the same serial data bus, and they also have to be sure that the central PC 12 is ready to receive the data, and likewise the central PC 12 has to be aware of any problems the RTU 14 might be having. This protocol however is simpler than that of the portable device as the serial data cable is very reliable and no sophisticated error checking needs to take place. In this case the central PC 12 is in charge of the channel, polling each RTU 14 in turn, asking if it has any data/commands to transmit to the central PC 12, if the answer is yes, the central PC 12 receives the data otherwise it passes onto the next RTU 14, and repeats the question.

However if the RTU fails to respond, it is flagged onto the central PC 12 display screen, and this can be used to trace failed units for maintenance purposes. For purposes of speed, if the central PC 12 has any data it wishes to transmit to the RTU 14, it doesn't wait until the cycle of polling is complete, but will transmit to the RTU 14 at any time.
Example:

| Central PC Action | RTU Action |
|---|---|
| <poll RTU 1> | |
| | <no data> |
| <poll RTU 2> | |
| | <no data> |
| <poll RTU 3> | |
| | <logon request> |
| <poll RTU 4> | |
| | <no data> |
| <Xmit pupil list to RTU 3> | |

Having thus described the preferred embodiments, I claim:

1. A method of electronically registering student attendance data comprising:
   (a) storing a plurality of student names in a central collection station;
   (b) downloading at least one set of student names from said plurality of student names stored in said central data collection station to at least one portable data collection device using a wireless radio-frequency link and storing the downloaded set of student names in said at least one portable data collection device;
   (c) accessing said set of student names stored in said portable data collection device;
   (d) displaying one select student name from said set of student names on a visual display of said portable data collection device;
   (e) prompting an operator of said portable data collection device to input attendance data for said select student name into said portable data collection device, said input attendance data including one of a first input indicating that the student having the select displayed name is present, a second input indicating that the student having the select displayed name is absent, and a third input indicating that the student having the select displayed name is tardy;
   (f) storing said input attendance data for each select student name in said at least one portable data collection device;
   (g) repeating steps (d)–(f) for each student name in said downloaded set of student names;
   (h) uploading said input student attendance data from said portable data collection device to said central data collection station using said wireless radio-frequency link;
   (i) storing said input attendance data in said central data collection station; and,
   (j) generating a student attendance report using said attendance data stored in said central data collection station.

2. The method of electronically registering student attendance data as set forth in claim 1 wherein said step (b) of downloading at least one set of student names from the central data collection station includes the subsidiary steps:
   (b1) inputting an operator personal identification security number into the portable data collection device;
   (b2) inputting a class designation identifier into the portable data collection device;
   (b3) uploading the operator personal identification security number and class designation identifier to the central data collection station using said wireless radio-frequency link;
   (b4) comparing said operator personal identification security number in said central data collection station to select operator personal identification numbers to verify the authority of said operator of said portable data collection device;
   (b5) retrieving said set of student names from said plurality of student names stored in said central data collection station based upon said class designation identifier; and,
   (b6) downloading said retrieved set of student names to said portable data collection device using said wireless radio-frequency link.

3. The method of electronically registering student attendance data as set forth in claim 2 wherein said step (h) of uploading said input attendance data to said central data collection station includes:
   (h1) appending a unique portable data collection device identifier to said input attendance data;
   (h2) uploading said input attendance data together with said set of student names and said unique portable data collection device identifier to said central data collection station using said wireless radio-frequency link.

4. The method of electronically registering student attendance data as set forth in claim 3 wherein said step (h2) of uploading input attendance data to said central data collection station comprises the subsidiary steps of:
   (h3) transmitting a wireless radio-frequency access control signal from said central data collection station to a plurality of portable data collection devices to indicate availability of said central data collection station to receive data from any one of said plurality of portable data collection devices;
   (h4) receiving said wireless radio-frequency access control signal with said at least one portable data collection device;
   (h5) using said at least one portable data collection device to detect the presence of wireless radio-frequency data transmission signals from the other of the plurality of portable data collection devices, said at least one portable device transmitting said input attendance data stored therein to said central data collection station if no wireless radio-frequency data transmission signal is detected from any of the other of the plurality of portable data collection devices.

5. The method of electronically registering student attendance data as set forth in claim 4 wherein said uploading step (h2) further comprises:
   (h6) delaying transmission of said input attendance data from said at least one portable data collection device to said central data collection station for a random duration if wireless radio-frequency data transmission signals from other of the plurality of portable data collection devices are detected; and,
   (h7) repeating steps (h5)–(h6) until said input attendance data stored in said first portable data collection device is transmitted to said central data collection station.

6. The method of electronically registering student attendance data as set forth in claim 5 further comprising, prior to step (j), the step of:
   using said central data collection station to collate student attendance data received from each of said plurality of portable data collection devices into a single student attendance file.

7. A method of collecting student attendance data comprising:
   a) using a wireless radio-frequency link, downloading plural sets of student data from a central computer to plural portable data collection units, respectively;
   b) for each downloaded set of student data, entering corresponding student attendance data into the portable data collection units;
   c) detecting periodic wireless radio-frequency access control signals transmitted from said central computer to each of the plurality of portable units;
   d) using said wireless radio-frequency link, uploading both the downloaded student data and entered student attendance data from each of said portable data collection units in succession to said central computer in response to the periodic radio-frequency access control signals generated by said central computer and transmitted to said portable data collection units, each of said portable data collection units repeatedly delaying data transmission for a random duration until no other portable unit is simultaneously transmitting data.

8. The method of collecting student attendance data as set forth in claim 7 wherein step (a) comprises downloading a different class name list to each of said portable units in response to a wireless radio-frequency request signal transmitted from each portable data collection unit to the central computer.

9. A method of remotely collecting student attendance data from a plurality of wireless portable student attendance data collection stations operating on a single transmission radio frequency, said method comprising:
   a) generating periodic access control signals with a central computer and transmitting the access control signals to each of the portable data collection stations using said transmission radio frequency;
   b) receiving the access control signals with each of the portable data collection stations;
   c) using said transmission radio frequency, transmitting collected student attendance data together with student name data from each portable unit to the central computer in response to received access control signals, wherein each of the portable data collection units from which data is to be transmitted transmits data to the central computer using said transmission radio frequency only if no other portable data collection unit is simultaneously transmitting data on said transmission radio frequency, and delays data transmission for successive random duration intervals if another portable data collection unit is simultaneously transmitting data to the central computer using said transmission radio frequency.

* * * * *